United States Patent

Noll et al.

[11] Patent Number: 4,485,226
[45] Date of Patent: Nov. 27, 1984

[54] PROCESS FOR THE PRODUCTION OF COMPOUNDS CONTAINING ISOCYANURATE GROUPS AND OLEFINIC DOUBLE BONDS, THE COMPOUNDS OBTAINABLE BY THIS PROCESS AND THEIR USE AS BINDERS OR BINDER COMPONENT IN COATING COMPOSITIONS

[75] Inventors: Klaus Noll; Josef Pedain, both of Cologne; Manfred Bock, Leverkusen, all of Fed. Rep. of Germany

[73] Assignee: Bayer Aktiengesellschaft, Leverkusen, Fed. Rep. of Germany

[21] Appl. No.: 606,308

[22] Filed: May 2, 1984

[30] Foreign Application Priority Data

May 18, 1983 [DE] Fed. Rep. of Germany ....... 3318147

[51] Int. Cl.$^3$ .................. C08G 18/32; C08G 18/67; C08G 18/79; C08G 18/80
[52] U.S. Cl. .................. 528/45; 204/159.19; 528/67; 528/73
[58] Field of Search ............ 528/45, 67, 73; 204/159.19; 521/902

[56] References Cited

U.S. PATENT DOCUMENTS

| | | | |
|---|---|---|---|
| 3,782,961 | 1/1974 | Takahashi et al. | 96/115 R |
| 4,088,498 | 5/1978 | Faust | 96/115 P |
| 4,089,844 | 5/1978 | Tsou | 528/73 |
| 4,306,051 | 12/1981 | Gras | 528/67 |
| 4,324,879 | 4/1982 | Bock et al. | 528/45 |
| 4,379,905 | 4/1983 | Stemmler et al. | 528/73 |

FOREIGN PATENT DOCUMENTS 1384343 2/1975 United Kingdom .
1491695 11/1977 United Kingdom .

Primary Examiner—Herbert S. Cockeram
Attorney, Agent, or Firm—Gene Harsh; Joseph C. Gil; Thomas W. Roy

[57] ABSTRACT

A process for the production of compounds which crosslink under the effect of high-energy radiation containing isocyanurate groups, olefinic double bonds, and, optionally, blocked or free isocyanate groups by reacting (i) isocyanurate-group-containing polyisocyanates which are based on aliphatic and/or cycloaliphatic diisocyanates with (ii) compounds containing at least one isocyanate-reactive group and at least one olefinic double bond, such as hydroxyl-containing esters of acrylic acid and methacrylic acid with at least dihydric aliphatic alcohols having a molecular weight of from 62 to about 300, to form urethanes, the quantitative ratios between the reactants being selected so that for every free isocyanate group in component (i), the reaction mixture contains from about 0.9 to 1.5 hydroxyl groups of component (ii).

The present invention also relates to the compounds prepared by this process and to the use of these compounds as the binder or a binder component in coating compositions crosslinkable by high-energy radiation.

16 Claims, No Drawings

PROCESS FOR THE PRODUCTION OF COMPOUNDS CONTAINING ISOCYANURATE GROUPS AND OLEFINIC DOUBLE BONDS, THE COMPOUNDS OBTAINABLE BY THIS PROCESS AND THEIR USE AS BINDERS OR BINDER COMPONENT IN COATING COMPOSITIONS

BACKGROUND OF THE INVENTION

1. Field of the Invention

This invention relates to a new process for the production of compounds containing isocyanurate groups and olefinic double bonds by reacting polyisocyanates containing isocyanurate groups with compounds containing isocyanate-reactive hydrogen atoms and olefinic double bonds, to the reaction products obtainable by this process and to their use as binder or as binder component in coating compositions crosslinkable by high-energy radiation.

2. Description of the Prior Art

Compounds containing olefinically unsaturated groups have long been known as binder-containing coating compositions. They are hardened by high-energy radiation, such as UV-radiation or electron beams, and are used for example for coating heat-sensitive substrates, such as wood or for the production of coatings for graphic purposes, i.e. for example in the printing industry or in the production of printed wiring boards.

A sub-group of radiation-crosslinked coating compositions of the type in question are urethane oligomers modified by compounds containing both ethylenically unsaturated groups and also isocyanate-reactive groups. Oligomers such as these are known, particularly for applications in the printing industry, and are described for example in DE-OS Nos. 21 15 373 and 21 21 253 and in GB-PS No. 1,379,228.

Radiation-crosslinking coating compositions which may be based on different types of oligourethanes have recently been described, again for applications in the printing industry (British Pat. No. 1,491,695).

Among those oligourethanes, a polyisocyanate modified by ethylenically unsaturated groups is particularly remarkable because, in addition to the purpose states in the above-mentioned patent, it is also suitable for the production of high quality lacquers. This particular oligourethane is based on the biuret-group-containing aliphatic polyisocyanate which corresponds to the following idealized formula

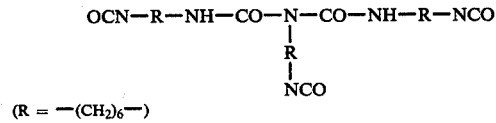

$(R = -(CH_2)_6-)$

Olefinically unsaturated oligourethanes based on this polyisocyanate, i.e. in particular its reaction products with hydroxyalkyl acrylate or methacrylate, may be reacted under the influence of high-energy radiation to form highly crosslinked, hard coatings or, alternatively, are suitable for use as additives to conventional radiation-crosslinking coating compositions to which they impart greater hardness or better abrasion resistance for example. However, their particular advantage lies in the fact that they may be used for producing coatings at room temperature, thereby enabling heat-sensitive substrates, such as wood, paper or leather, to be coated.

However, the oligourethanes referred to are also attended by certain disadvantages. Thus, radiation crosslinking is accompanied by more or less serious discoloration which is particularly troublesome in the coating of white and light-colored substrates. In addition, their weather resistance is often inadequate.

It has now surprisingly been found that these disadvantages may be overcome by using isocyanurate-group-containing polyisocyanates based on aliphatic and/or cycloaliphatic polyisocyanates for the production of olefinically unsaturated isocyanate addition products.

This discovery is particularly surprising in view of the fact that two-component polyurethane lacquers based both on aliphatic polyisocyanates containing biuret groups and on aliphatic polyisocyanates containing isocyanurate groups may be used with equal effect for the production of light-stable and weather-resistant coatings, so that radiation-crosslinkable binders based on isocyanurate polyisocyanates could not be expected to differ with advantage in these properties from radiation-crosslinkable binders based on biuret polyisocyanates.

SUMMARY OF THE INVENTION

The present invention relates to a process for the production of compounds which crosslink under the effect of high-energy radiation containing isocyanurate groups, olefinic double bonds and, optionally, isocyanate groups which are optionally blocked by reacting
(i) isocyanurate-group-containing polyisocyanates, wherein up to about 70% of the isocyanate groups may be blocked with blocking agents for isocyanate groups and which are optionally present in admixture with isocyanurate-group-free, aliphatic and/or cycloaliphatic polyisocyanates, up to about 70% of whose isocyanate groups may be blocked with blocking agents for isocyanate groups, these isocyanurate polyisocyanates being based on aliphatic and/or cycloaliphatic diisocyanates, with
(ii) compounds containing at least one isocyanate-reactive group and at least one olefinic double bond, comprising a member selected from the group consisting of hydroxyl-containing esters of acrylic acid and/or methacrylic acid with at least dihydric aliphatic alcohols having a molecular weight in the range from 62 to about 300,
to form urethanes, the quantitative ratios between the reactants being selected in such a way that, for every free isocyanate group in component (i), the reaction mixture contains from about 0.9 to 1.5 hydroxyl groups of component (ii).

The present invention also relates to the isocyanurate-group-containing reaction products obtainable by this process, characterized by
(a) a content of isocyanurate groups (molecular weight=126) of from about 5 to 20% by weight,
(b) a content of free isocyanate groups of from 0 to about 15% by weight,
(c) a content of blocked isocyanate groups (expressed as NCO) of from 0 to about 10% by weight and,
(d) a content of olefinic C=C double bonds (molecular weight=24) of from about 2 to 15% by weight,
these percentages being based on the total weight of the reaction products, excluding the weight of the blocking agent for isocyanate groups optionally present.

Finally, the present invention also relates to the use of the reaction products containing isocyanurate groups and olefinic double bonds obtainable by this process as the binder or a binder component in coating compositions crosslinkable by high-energy radiation.

DETAILED DESCRIPTION OF THE INVENTION

Isocyanurate-group-containing polyisocyanates based on aliphatic and/or cycloaliphatic diisocyanates are used as component (i) in the process according to the invention. The corresponding isocyanato-isocyanurates based on hexamethylene diisocyanate and/or 1-isocyanato-3,3,5-trimethyl-5-isocyanatomethyl cyclohexane (isophorone diisocyanate=IPDI) are particularly preferred. The production of isocyanurate polyisocyanates such as these is described, for example, in DE-PS No. 2,616,416, in EP-OS No. 3765, in EP-OS No. 10 589, in EP-OS No. 47 452, in U.S. Pat. No. 4,288,586 or in U.S. Pat. No. 4,324,879. The starting materials (i) suitable for use in accordance with the invention are of course not confined to the products of these prior publications which are mentioned purely by way of example. On the contrary, any isocyanurate polyisocyanates based on aliphatic and/or cycloaliphatic diisocyanates which have a total isocyanate content of from about 10 to 30% by weight and preferably from about 15 to 25% by weight may be used in the process according to the invention. These compounds are simple tris-isocyanatoalkyl (or cycloalkyl) isocyanurates corresponding to the following formula

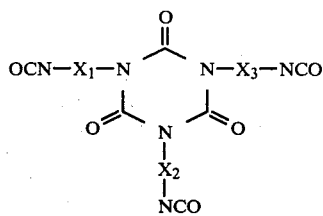

in which $X_1$, $X_2$ and $X_3$ may be the same or different and represent the hydrocarbon radical on which the starting diisocyanate is based, or mixtures of these isocyanurates with their higher homologs containing more than one isocyanurate ring.

Up to about 70% (and preferably up to about 50%) of the isocyanate groups in the isocyanurate polyisocyanates used as component (i) may be blocked by blocking agents known per se for isocyanate groups, such as for example ε-caprolactam, butanone oxime, malonic acid diethyl ester or acetoacetic acid ethyl ester. However, unblocked isocyanurate polyisocyanates based on only one starting diisocyanate ($X_1=X_2=X_3$) are preferably used in the process according to the invention.

In the practical application of the process according to the invention, the isocyanurate polyisocyanates essential to the invention may also be used in admixture with up to about 60 and preferably with up to about 40 NCO-equivalent percent, based on the total quantity of polyisocyanates, of isocyanurate-free polyisocyanates containing aliphatically and/or cycloaliphatically bound isocyanate groups. However, it is preferred to use the "technically pure" starting substances, i.e. starting substances of which at least 95 NCO-equivalent percent are isocyanurate polyisocyanates.

The starting materials optionally used together with these preferred starting compounds are, for example, uretdione diisocyanates containing aliphatically and/or cycloaliphatically bound isocyanate groups corresponding to the following formula

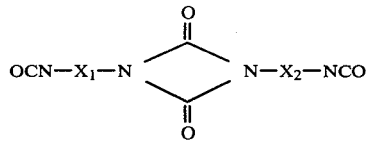

which, in any event, are often formed in minor quantities (from about 0.1 to 5 and, more particularly, from about 0.3 to 3 NCO-equivalent percent) in addition to the isocyanurate polyisocyanates in the trimerization of aliphatic and/or cycloaliphatic diisocyanates.

Apart from these uretdione diisocyanates, the isocyanurate polyisocyanates according to the invention may also be used in admixture with simple aliphatic and/or cycloaliphatic diisocyanates, such as, for example hexamethylene diisocyanate and/or isophorone diisocyanate, and/or in admixture with the traditional "lacquer polyisocyanates" such as, for example, tris-(6-isocyanatohexyl)-biuret and its higher homologs, and the urethane-group-containing polyisocyanates obtained by reacting excess quantities of isophorone diisocyanate with polyhydric alcohols, such as trimethylol propane. Up to about 70% and preferably up to about 50% of the isocyanate groups of the polyisocyanates optionally used in addition to the isocyanurate polyisocyanates essential to the invention may also be blocked by blocking agents of the type mentioned by way of example.

Component (ii) is a hydroxyl-containing ester of acrylic acid and/or methacrylic acid with at least dihydric aliphatic alcohols having a molecular weight in the range from 62 to about 300. Typical compounds of this type are, for example, 2-hydroxyethyl acrylate, 2-hydroxyethyl methacrylate, 2-hydroxypropyl acrylate, 2-hydroxypropyl methacrylate, 3- and 4-hydroxybutyl acrylate, 3- and 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, the di(meth)acrylic acid esters of 1,1,1-trimethylol propane or of glycerol. Particularly preferred starting components (ii) are 2-hydroxyethyl and 2-hydroxypropyl acrylate or methacrylate. Mixtures of these compounds may of course also be used. The reaction according to the invention is generally carried out by mixing the components at elevated temperatures in the range from about 40° to 100° C. and preferably in the range from about 50° to 80° C. In general, steps should be taken to ensure that undesirable, heat-induced polymerization reactions are suppressed. Because of this, it is often best to work at relatively low temperatures within the ranges indicated using known catalysts which accelerate the isocyanate addition reaction. Suitable catalysts are, for example, alkali metal alcoholates such as sodium ethylate; tertiary amines such as triethylamine, diethylene triamine or dimethyl benzylamine; or tin catalysts such as tin dioctoate or dibutyl tin dilaurate.

The reaction may be carried out in the absence or presence of inert solvents such as, for example, ethylacetate, butylacetate, ethyl glycol acetate and/or methyl isobutyl ketone.

In the reaction according to the invention, the quantitative ratios between the reactants are selected in such a way that, for every free isocyanate group in the polyisocyanate component (i), which is composed of the isocyanurate polyisocyanates and, optionally, isocyanurate-free polyisocyanates, the reaction mixture contains from about 0.9 to 1.5 and preferably from about 1.0 to 1.2 hydroxyl groups of component (ii). Where unblocked polyisocyanates are used and where the reaction according to the invention is carried out using stoichiometric quantities of the starting materials, isocyanate-free, olefinically unsaturated products are formed and may be used as radiation-crosslinkable binders or binder components for coating compositions. Where partly blocked polyisocyanates are used and/or where a substoichiometric quantity of component (ii) is used, the products formed contain free and/or blocked isocyanate groups in addition to olefinic double bonds. These reaction products according to the invention are suitable, for example, as binders or as binder components in combination with compounds containing isocyanate-reactive groups, such as for example the polyhydroxy polyesters and/or polyhydroxy polyacrylates known from the chemistry of polyurethane lacquers, with which they may be processed as the polyisocyanate component in two-component systems. After polyurethane formation which takes place either spontaneously (free isocyanate groups) or after thermal hardening (blocked isocyanate groups), systems such as these may be converted by high-energy radiation into their crosslinked state.

The preferred reaction products according to the invention are characterized by the above-mentioned contents of isocyanurate groups, free isocyanate groups, blocked isocyanate groups and olefinic double bonds.

The reaction products according to the invention crosslinkable by high-energy radiation are generally clear, medium viscosity to high viscosity, colorless liquids. If their viscosity is too high for the desired application, they may be diluted with solvents. Solvents suitable for this purpose are aromatic hydrocarbons such as toluene, xylenes and more highly substituted benzenes; esters such as ethylacetate, butylacetate, methoxy or ethoxy ethylacetate and butoxy ethylacetate; ketones such as acetone, methylethyl ketone, methyl isobutyl ketone and cyclohexanone; and also alcohols such as methanol, ethanol, propanol, i-propanol, butanol, i-butanol, etc. However, alcohols can only be used in cases where the binders according to the invention do not contain any free isocyanate groups.

Solvents in the broader sense also include ethylenically unsaturated, low molecular weight compounds, such as for example esters of acrylic or methacrylic acid with aliphatic $C_1$–$C_8$-, cycloaliphatic $C_5$–$C_6$-, araliphatic $C_7$–$C_8$-monoalcohols, for example methylacrylate, ethylacrylate, n-propylacrylate, n-butylacrylate, methylhexylacrylate, 2-ethylhexylacrylate and the corresponding methacrylic acid esters; cyclopentyl acrylate, cyclohexylacrylate or the corresponding methacrylic acid esters; benzylacrylate, $\beta$-phenylethylacrylate and corresponding methacrylic acid esters; hydroxyalkyl esters of acrylic or methacrylic acid containing from 2 to 4 carbon atoms in the alcohol component, such as 2-hydroxyethylacrylate, 2-hydroxypropylacrylate, 3-hydroxypropylacrylate, 2-hydroxybutylacrylate, 4-hydroxybutylacrylate or corresponding methacrylic acid esters; di- and polyacrylates and also di- and polymethacrylates of glycols containing from 2 to 6 carbon atoms and polyols containing from 3 to 4 hydroxyl groups and from 3 to 6 carbon atoms, such as ethylene glycol diacrylate, 1,3-propane diol diacrylate, 1,4-butane diol diacrylate, 1,6-hexane diol diacrylate, trimethylol propane triacrylate, pentaerythritol tri- and tetra-acrylate and corresponding methacrylates; also di(meth)acrylates of polyether glycols of glycol, 1,3-propane diol, 1,4-butane diol, tetraethoxylated trimethylol propane tris-acrylate; aromatic vinyl and divinyl compounds, such as styrene, methyl styrene, divinylbenzene; N-methylol acrylamide or N-methylol methacrylamide and corresponding N-methylol alkyl ethers containing from 1 to 4 carbon atoms in the alkyl ether group and corresponding N-methylol allyl ethers, particularly N-methoxymethyl(meth)acrylamide, N-butoxymethyl(meth)acrylamide and N-allyloxymethyl(meth)acrylamide; vinyl alkyl ethers containing from 1 to 4 carbon atoms in the alkyl group, such as vinyl methylethyl ether, vinyl ethyl ether, vinyl propyl ether, vinyl butyl ether; trimethylol propane diallyl ether mono(meth)acrylate, vinyl pyridine, N-vinyl carbazole, triallyl phosphate, triallyl isocyanurate and others. These olefinically unsaturated "solvents" listed by way of example are not in fact genuine solvents, but instead should be regarded as "reactive diluents" because, in the radiation crosslinking of the reaction products according to the invention, they react off with those products through copolymerization. In cases where the reaction products according to the invention do not have to be processed at elevated temperatures, i.e. at temperatures above the boiling point of the reactive diluents in question (absence of blocked isocyanate groups), reactive diluents such as these are preferably used instead of the usual solvents.

Other compounds containing olefinic double bonds which may optionally be used in the application in accordance with the invention are, for example, olefinically unsaturated resins such as unsaturated polyester resins, unsaturated hydrocarbon resins or unsaturated polyurethane resins.

However, when using the specific reaction products according to the invention (i.e. reaction products of isocyanurate polyisocyanates with the starting component (ii)) in combination with other olefinically unsaturated compounds (reaction products of isocyanurate-free polyisocyanates with component (ii), reactive diluents of the type mentioned by way of example and/or unsaturated resins of the type mentioned last), it is important to ensure that the percentage of the specific reaction products, based on the total quantity of olefinically unsaturated compounds, amounts to at least about 20 and preferably to at least about 40% by weight.

The reaction products according to the invention and combinations thereof with compounds containing isocyanate-reactive groups (where isocyanate-group-containing reaction products according to the invention are used) and/or which other olefinically unsaturated compounds are valuable binders for coatings. They may be used as such or in combination with the auxiliaries and additives known from lacquer technology such as fillers, pigments, solvents, leveling aids and the like, and optionally after the addition of a photoinitiator, for the production of coatings on any substrates. These coating compositions may be applied in known manner by spray coating, knife coating, roll coating, spread coating, dip coating or casting. After the evaporation of any inert solvents used, crosslinking of the coatings may be initiated by exposure to high-energy radiation. The isocyanate polyaddition reaction which may also occur (use of the reaction products according to the invention containing free or blocked polyisocyanate groups in combination with polyhydroxyl compounds) may take place before or during this irradiation, optionally under the effect of heat.

The high-energy radiation may entail, for example, bombardment with electrons under a voltage of about 150–500 KV and a current of about 0.1–10 mA. The total dose depends upon the thickness of the film applied and the density of its pigmentation (when it has been pigmented). It may amount to between about 0.1 and 50 Mrad and preferably amounts to between about 1 and 20 Mrad. In this context, 1 rad represents a radiation dose corresponding to an absorption of $10^5$ joules per gram of substrate, i.e. in this case per gram of the coating.

In general, the electron beam is generated in a linear electron accelerator in which the electrons emitted from a heated metal body are accelerated in a d.c. voltage field to a velocity corresponding to the d.c. voltage indicated above. By electrostatic or electromagnetic deflection, the beam can be fanned out to a considerable extent so that the entire width of a coated workpiece is irradiated when it is moved through beneath the radiation source.

UV-light may also be used as the high-energy radiation for initiating crosslinking. Where UV-light is used, however, additives have to be introduced on the one hand to prevent the inhibition of radical cross-linking by atmospheric oxygen and, on the other hand, to initiate radiation crosslinking.

Additives suitable for preventing inhibition include phenols and phenol derivatives, preferably sterically hindered phenols carrying alkyl substituents in both o-positions to the hydroxyl group; amines, preferably secondary acrylamines and derivatives thereof; copper-(I) salts or organic acids; and adducts of Cu-(I) halides with phosphites.

Suitable photoinitiators are the compounds normally used, for example benzophenone, and—quite generally—aromatic keto compounds derived from benzophenone, such as alkyl benzophenones, halogen-methylated benzophenones according to DE-OS No. 19 49 010, Michler's ketone, anthrone and halogenated benzophenones. Other suitable photoinitiators are benzoin and its derivatives, for example according to DE-OS Nos. 17 69 168, 17 69 853, 17 69 854, 18 07 297, 18 07 301, 19 16 678 or 24 30 081 and DE-AS No. 16 94 149. Other effective photoinitiators are anthraquinone and many of its derivatives, for example $\beta$-methyl anthraquinone, tert.-butyl anthraquinone and anthraquinone carboxylic acid esters, also oxime esters according to DE-OS No. 17 95 089.

The above-mentioned photoinitiators, are used in quantities of from about 0.1 to 20% by weight and preferably in quantities of from about 0.1 to 5% by weight, based on polymerizable components, depending on the purpose for which the reaction products according to the invention are to be used. The photoinitiators may be used either individually or, by virtue of frequent, favorable synergistic effects, in combination with one another. Suitable radiation sources for carrying out photopolymerization include artificial radiation sources emitting in the range from about 250 to 500 nm and preferably in the range from about 300 to 400 nm. It is of advantage to use mercury vapor, xenon and tungsten lamps, with high pressure mercury lamps being particularly advantageous.

In general, layers of the reaction products according to the invention having a thickness of from about 1 $\mu$m to 0.1 mm (1 $\mu$m = $10^{-3}$ mm) may be hardened to form a film in less than 1 second when exposed to the light of a high pressure mercury lamp, for example of the HTQ-7 type manufactured by Philips, arranged at a distance of approximately 8 cm.

Where fillers are used in the application of the resin compositions according to the invention as UV-light-hardening coatings, their use is confined to those which do not suppress the polymerization reaction through their absorption behavior. For example, talcum, heavy spar, chalk, gypsum, silicas, asbestos powders and light spar, may be used as light-permeable fillers.

Suitable substrates are paper, cardboard, leather, wood, plastics, bonded fabrics, textiles, ceramic materials, mineral materials, glass, metals, artificial leather, photographic materials, such as for example emulsion-coated paper, transfer films, preferably wood, plastics, ceramic materials, mineral materials and photographic materials. Since the coating compositions harden to form films having excellent mechanical properties in fractions of a second to a few seconds, it is possible for example to adapt the coating process to the processing speeds normally encountered in the printing field.

In addition, the binders according to the invention may also be emulsified in water using external emulsifiers and, optionally, additives of the type normally used for emulsification and applied in the form of emulsions.

Suitable emulsifiers are anionic, non-ionic, cationic, ampholytic or high molecular weight substances and mixtures thereof. Corresponding emulsifiers are described, for example, in Ullmanns Enzyklopadie der Technischen Chemie, Vol. 10, 4th Edition, Chapter on Emulsions, pages 449 et seq. Suitable emulsifiers may readily be determined both qualitatively and quantitatively by simple small-scale tests.

The emulsions may contain from about 10 to 70% by weight, preferably from about 30 to 70% by weight, and more particularly, from about 40 to 60% by weight of the binders according to the invention.

In the following Examples, all the figures quoted in percent and in parts represent percentages by weight and parts by weight, respectively.

The isocyanurate polyisocyanates used in the following Examples are prepared as follows:

1. Polyisocyanate of hexamethylene diisocyanate (HDI)

1 ml of 2-dimethylaminomethyl nonylphenol was added at 23° C. to 1344 g of HDI in a three-necked flask. After stirring for 5 minutes, 40 ml of a 2% solution of 2-hydroxyethyl trimethylammonium hydroxide in dimethyl formamide/methanol (8:1) were added dropwise over a period of 15 minutes, again at 23° C. In that time, the temperature rose to 35° C. and, after another 45 minutes, to 40° C. The trimerization reaction was maintained at that temperature. After 6 hours, the NCO-content had reached 40.5%. The reaction product was stabilized with 0.3 ml of nonafluorobutane sulfonic acid in 1 ml of dimethyl formamide and subsequently thin-layered in a high vacuum.

Yield: 417 g (31%)
Iodine color number (DIN 6162): 3
NCO-content: 22.0%
Viscosity (25° C.): 3100 mPa.s
Monomeric HDI: 0.18%

2. Polyisocyanate of 3-isocyanatomethyl-3,5,5-trimethyl cyclohexyl isocyanate (IPDI)

1332 g of IPDI were heated to 80° C. in a three-necked flask. 15 ml of a 6% solution of 2-hydroxyethyl trimethyl ammonium hydroxide in dimethyl formamide/methanol (4:1) were slowly and uniformly added dropwise from a dropping funnel over a period of 45 minutes, the temperature rising to around 88° C. (the temperature should not exceed 90° C.; at too high a temperature, trimerization is unspecific and leads to relatively high viscosities of the end product). After the dropwise addition, the mixture was stirred for 30 minutes, the temperature falling to 80° C. The NCO-content of the trimer solution then amounted to 30.6%. The reaction product was thin-layered in a high vacuum and the resin subsequently dissolved to form a 75% solution in ethyl glycol acetate.

Yield (resin): 580 g (44%)
Viscosity (solution): 5107 mPa.s (25° C.)
NCO-content (solution): 12.5%
Free IPDI (solution): 0.18%

3. Polyisocyanate of a mixture of HDI and IPDI 100 ml of a 5% solution of N-dodecyl-N,N-dimethyl-N-(2-hydroxyethyl)-ammonium hydroxide in 2-ethyl hexanol/ethanol (8:1) were added at 65° C. to a mixture of 4704 g (28 moles) of HDI and 1554 g (7 moles) of IPDI. The reaction was immediately exothermic and was held at 80° C. for 10 minutes by cooling. After removal of the cooling, the temperature rose to 96° C. After another 15 minutes, the temperature fell and was kept at 80° C. by heating. After a total of 1 hour, the catalyst was deactivated. The NCO-content of the mixture was then constant and amounted to 39.9%. The product almost completely freed from monomeric diisocyanates by thin-layer distillation (residual HDI content: 0.25%, residual IPDI content: 0.37%) had a slight yellowish color, an NCO-content of 19.8% and a viscosity of 5320 mPa.s (23° C.).

EXAMPLE 1

191 parts of polyisocyanate 1 were dissolved in 365 parts of anhydrous toluene, followed by the addition at room temperature of 174 parts of hydroxyethylacrylate. After the addition of 0.5 part of tin dioctoate, the temperature is slowly increased to 60° C. and the mixture was stirred until the NCO-content had fallen to 0. After cooling to room temperature, 1.8 parts of 2,6-di-t-butylphenol were added and solvent was removed by vacuum distillation until the concentration amounted to 70%. The solution obtained was almost colorless with a slight yellow tinge and had a viscosity of approximately 5000 mPa.s (23° C.). The content in the oligourethane of olefinic double bonds (MW=24) amounted to 7.8% and that of isocyanurate groups (MW=126) amounted to 13.6%.

EXAMPLE 2

191 parts of polyisocyanate 1 were dissolved in 90 parts of anhydrous xylene and the resulting solution was mixed at room temperature with 168 parts of 2-hydroxypropyl methacrylate. After the addition of 0.5 part of tin dioctoate, the temperature was slowly increased to 60° C. and the mixture was stirred until the NCO-content had fallen to 0. After cooling to room temperature, 1.8 parts of 2,6-di-t-butylphenol were added. The 80% solution was substantially colorless and had a viscosity of approximately 12,000 mPa.s (23° C.). The content in the oligourethane of olefinic double bonds amounted to 7.1% and that of isocyanurate groups amounted to 12.5%.

EXAMPLE 3

336 parts of polyisocyanate solution 2 were diluted with 50 parts of ethyl glycol acetate, followed by the addition at room temperature of 152 parts of hydroxy ethyl methacrylate. After the addition of 1 part of tin dioctoate, the temperature was slowly increased to 70° C. and the mixture was stirred until the NCO-content had fallen to 0. After cooling to room temperature, 2 parts of 2,6-di-t-butylphenol were added. The 75% solution was substantially colorless and had a viscosity of approximately 10,000 mPa.s (23° C.). The content in the oligourethanes of olefinic double bonds amounted to 6.2% and that of isocyanurate groups amounted to 10.9%.

EXAMPLE 4

212 parts of polyisocyanate 3 were dissolved in 104 parts of ethyl glycol acetate and 58 parts of butanone oxime were added to the resulting solution at room temperature. The mixture was heated to 80° C. and stirred until the NCO-content had reached or just fallen below 3.7%. It was then cooled to 50° C., followed by the addition of 42.5 parts of hydroxyethyl acrylate and 1 part of tin dioctoate. The temperature was then increased to around 70° C. When the NCO-content had fallen to 0, the mixture was cooled to room temperature and 1.5 parts of 2,6-di-t-butylphenol were added. The 75% solution obtained was clear and almost colorless and had a viscosity of approximately 3500 mPa.s (23° C.). The content in the oligourethane (not including the weight of the blocking agent) of olefinic double bonds amounted to 3.1%, that of isocyanurate groups amounted to 10.0% and that of blocked isocyanate groups (MW=42) amounted to 16.7%.

EXAMPLE 5

250 parts of the adduct of Example 3 were diluted with 125 parts of xylene. After the addition of 9.4 parts of benzophenone and 0.9 parts of Darocur 1173 (a commercially available UV-initiator manufactured by the Merck Company, Darmstadt), the solution was applied by spray gun to a bonderized steel plate in a wet layer thickness of approximately 60 μm. After the solvent had been evaporated off, the plate was moved below a Hanovia lamp (80 W/cm, distance 8 cm) at a speed of 20 meters per minute. The coating was immediately dry, clear and completely colorless and had a Konig pendulum hardness of 170 seconds (DIN 53157).

EXAMPLE 6

250 parts of the unsaturated resin according to Example 3 of EP-OS No. 53 749 and U.S. Pat. No. 4,380,604 were dissolved in 675 parts of a mixture of equal parts of xylene and butyl acetate. 200 parts of the adduct of Example 1 were added to the resulting solution, followed by stirring until a homogeneous mixture was obtained. 22.5 parts of benzophenone and 2.3 parts of Darocur 1173 were then added. The 40% solution had a viscosity of approximately 1000 mPa.s at 23° C. In a casting machine, a printed carton was coated in such a way that a dry layer thickness of 15 μm was obtained after evaporation of the solvents. The coated carton was moved below a Hanovia lamp at a speed of 20 m/minute in the same way as in Example 5. A dry, glossy, colorless and elastic coating having a pendulum hardness of 90 seconds was obtained.

EXAMPLE 7

229 parts of polyisocyanate 1 and 152 parts of a biuret polyisocyanate with an NCO-content of 22%, containing a mixture of N,N',N''-tris-(isocyanatohexyl)biuret with its higher homologs, were dissolved in 659 parts of anhydrous toluene, followed by the addition at room temperature of 278 parts of hydroxyethylacrylate. After the addition of 1.5 parts of tin dioctoate, the temperature was slowly increased to 60° C. and the mixture was stirred until the NCO-content had fallen to 0. After cooling to room temperature, 3.6 parts of 2,6-di-t-butylphenol were added and solvent was removed by vacuum distillation until the concentration amounted to 70%. The solution obtained was substantially colorless and had a viscosity of 7000 mPa.s (23° C.). The content in the oligourethane of olefinic double bonds (MW=24) amounted to 7.8% and that of isocyanurate groups (MW=126) amounted to 8.1%.

EXAMPLE 8

190 parts of the biuret polyisocyanate of Example 7 were dissolved in 364 parts of anhydrous toluene, followed by the addition at room temperature of 174 parts of hydroxyethylacrylate. After the addition of 0.5 part of tin dioctoate, the temperature was slowly increased to 60° C. and the mixture was stirred until the NCO-content had fallen to 0. After cooling, 1.8 parts of 2,6-di-t-butylphenol were added and the solvent and excess hydroxyethylacrylate were removed by vacuum distillation. The residual oligourethane was colorless but slightly cloudy and had a viscosity of approximately 35,000 mPa.s. The content in the oligourethane of olefinic double bonds (MW=24) amounted to 7.8%.

EXAMPLE 9

9.4 parts of benzophenone and 0.9 part of Darocur 1173 (cf. Example 5) were added to quantities of 250 parts of the adducts of Examples 1, 7 and 8, followed by knife coating onto bonderized steel plates in such a way that all three oligomers form a 25 μm thick dry layer after evaporation of the solvent. The plates were moved below a Hanovia lamp (80 W/cm, distance 8 cm) at a speed of 20 meters per minute. Thereafter the coatings were hard and tack-free.

The coatings according to Examples 1 and 7 were substantially colorless while the coating according to Example 8 had assumed a pale yellow-brown coloration.

The three plates were subjected to a 1000-hour weathering test on a Q.U.V. Weatherometer (Q.-Panel Company, England).

The Table shows the 20° reflectometer values of the following gloss assessment according to DIN 67530 (Gardner Reflectometer):

| Example No. | Initial Value | After Weathering |
|---|---|---|
| 1 | 89 | 75 |
| 7 | 87 | 68 |
| 8 | 90 | 53 |

EXAMPLE 10

43.2 parts of 2-hydroxypropyl methacrylate were added at room temperature to 336 parts of polyisocyanate solution 2. After the addition of 1 part of tin dioctoate, the temperature was slowly increased to 60° C. and the mixture was stirred for 2.5 hours. After cooling, 2 parts of 2,6-di-t-butylphenol were added. The solution obtained had a solids content of 78% and an NCO-content of 6.9%. Its viscosity at 23° C. amounted to approximately 6500 mPa.s. The oligomer contained 2.7% of olefinic double bonds (MW=24) and approximately 12.8% of isocyanurate groups (MW=126).

EXAMPLE 11

A mixture of 84 parts of a polyester diol of 1,6-hexane diol and adipic acid (OH number 134) and 4.5 parts of 1,4-butane diol dissolved in 84 parts of DMF was mixed with 76.8 parts of the adduct of Example 10 and heated to 60°–70° C. after the addition of 0.8 part of 2,6-di-t-butylphenol. The mixture increased in viscosity and was kept readily stirrable by dilution at intervals with a total of 130 parts of toluene. After the solvent had been added, the viscosity was increased by the addition of portions amounting to 1 part of the adduct according to Example 10 at relatively long intervals until it amounted to approximately 10,000 mPa.s at 23° C. 8 parts of 1,4-butane diol diacrylate, 7.7 parts of benzophenone and 0.77 part of Darocur 1173 (cf. Example 5) were then added.

The solution was then knife-coated onto an aluminum plate in such a way that a 30 μm thick dry film was formed. Evaporation of the solvents left a strong elastic film which could be removed from the substrate with acetone. After the coated plate had been passed beneath a high-pressure mercury lamp in the same way as described in Example 5, the coating showed only a slight tendency to swell in acetone.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of compounds which crosslink under the effect of high-energy radiation containing isocyanurate groups, olefinic double bonds and, optionally, blocked or free isocyanate groups which comprises reacting
   (i) isocyanurate-group-containing polyisocyanates which are based on aliphatic and/or cycloaliphatic diisocyanates with
   (ii) compounds containing at least one isocyanate-reactive group and at least one olefinic double bond, comprising at least one member selected from the group consisting of hydroxyl-containing esters of acrylic acid and methacrylic acid with at least dihydric aliphatic alcohols having a molecular weight of from 62 to about 300, to form urethanes, the quantitative ratios between the reactants being selected so that for every free isocyanate group in (i), the reaction mixture contains from about 0.9 to 1.5 hydroxyl groups of component (ii).

2. The process of claim 1 wherein up to about 70% of the isocyanate groups of the isocyanurate-group-containing polyisocyanates are blocked with blocking agents for isocyanate groups.

3. The process of claim 1 wherein said isocyanurate-group-containing polyisocyanates are present in admixture with isocyanurate-group-free, aliphatic and/or cycloaliphatic polyisocyanates.

4. The process of claim 3 wherein up to about 70% of the isocyanate groups of said isocyanurate-group-free aliphatic and/or cycloaliphatic polyisocyanates are blocked with blocking agents for isocyanate groups.

5. The process of claim 1 wherein said isocyanurate-group-containing polyisocyanates are based on hexamethylene diisocyanate and/or 1-isocyanato-3,3,5-trimethyl-5-isocyanatomethyl-cyclohexane.

6. The process of claim 2 wherein said isocyanurate-group-containing polyisocyanates are based on hexamethylene diisocyanate and/or 1-isocyanato-3,3,5-trimethyl-5-isocyanatomethyl-cyclohexane.

7. The process of claim 3 wherein said isocyanurate-group-containing polyisocyanates are based on hexamethylene diisocyanate and/or 1-isocyanato-3,3,5-trimethyl-5-isocyanatomethyl-cyclohexane and said isocyanato-group-free aliphatic and/or cycloaliphatic polyisocyanates comprise a member selected from the group consisting of hexamethylene diisocyanate, 1-isocyanato-3,3,5-trimethyl-5-isocyanatomethyl-cyclohexane and mixtures thereof.

8. The process of claim 4 wherein said isocyanurate-group-containing polyisocyanates are based on hexamethylene diisocyanate and/or 1-isocyanato-3,3,5-trimethyl-5-isocyanatomethyl-cyclohexane and said isocyanato-group-free aliphatic and/or cycloaliphatic polyisocyanates comprise a member selected from the group consisting of hexamethylene diisocyanate, 1-isocyanato-3,3,5-trimethyl-5-isocyanatomethyl-cyclohexane and mixtures thereof.

9. The process of claim 1 wherein component (ii) comprises hydroxyethyl acrylate, 2-hydroxypropyl acrylate, hydroxyethyl methacrylate, 2-hydroxypropyl methacrylate and mixtures thereof.

10. The process of claim 2 wherein component (ii) comprises hydroxyethyl acrylate, 2-hydroxypropyl acrylate, hydroxyethyl methacrylate, 2-hydroxypropyl methacrylate and mixtures thereof.

11. The process of claim 5 wherein component (ii) comprises hydroxyethyl acrylate, 2-hydroxypropyl acrylate, hydroxyethyl methacrylate, 2-hydroxypropyl methacrylate and mixtures thereof.

12. The process of claim 6 wherein component (ii) comprises hydroxyethyl acrylate, 2-hydroxypropyl acrylate, hydroxyethyl methacrylate, 2-hydroxypropyl methacrylate and mixtures thereof.

13. The process of claim 7 wherein component (ii) comprises hydroxyethyl acrylate, 2-hydroxypropyl acrylate, hydroxyethyl methacrylate, 2-hydroxypropyl methacrylate and mixtures thereof.

14. The compounds produced in accordance with claim 1.

15. The compounds of claim 14 which are further characterized by
   (a) a content of isocyanurate groups (molecular weight equals 126) of from about 5–20% by weight,
   (b) a content of free isocyanate groups of from 0 to about 15% by weight,
   (c) a content of blocked isocyanate groups (expressed as NCO) of from 0 to about 10% by weight and
   (d) a content of olefinic C=C double bonds (molecular weight equals 24) of from about 2 to 15% by weight, the percentages being based on the total weight of the reaction mixture excluding the weight of any blocking agent which may be present.

16. Coating compositions which are crosslinkable by high-energy radiation wherein the binders of said coating compositions comprise the compounds of claim 14.

* * * * *